United States Patent [19]
Martin et al.

[11] Patent Number: 5,124,859
[45] Date of Patent: Jun. 23, 1992

[54] NARROW BANDPASS REFLECTIVE OPTICAL FILTER

[75] Inventors: Frederick Martin, Menlo Park, Calif.; Timothy Fohl, Carlisle, Mass.

[73] Assignees: GTE Government Systems Corporation, Mountain View, Calif.; GTE Laboratories, Incorporated, Waltham, Mass.

[21] Appl. No.: 705,477

[22] Filed: May 24, 1991

[51] Int. Cl.$^5$ .................................. G02B 5/24
[52] U.S. Cl. ........................ 359/886; 359/350; 359/358; 359/361; 250/573; 250/458.1
[58] Field of Search ............... 359/885, 886, 894, 46, 359/350, 358, 361, 399; 250/253, 458.1, 343, 573, 574, 269; 356/256; 372/57, 58

[56] References Cited

U.S. PATENT DOCUMENTS

| | | | |
|---|---|---|---|
| 3,904,868 | 9/1975 | McEwan et al. | 359/886 |
| 4,271,124 | 6/1981 | Specter | 359/358 |
| 4,292,526 | 9/1981 | Marling | 359/886 |
| 4,309,080 | 1/1982 | Hanchard et al. | 359/886 |
| 4,337,998 | 7/1982 | Basiulis | 359/886 |
| 4,862,101 | 8/1989 | Emmons | 359/886 |
| 5,052,804 | 10/1991 | Martin | 356/256 |

Primary Examiner—Loha Ben
Attorney, Agent, or Firm—James J. Cannon, Jr.

[57] ABSTRACT

A narrow passband, reflective optical filter at a wavelength L, has a container filled with a pressurized gas, the pressurized gas having a ground state transition corresponding to the wavelength L and transparent to all other wavelengths. The container has at least one optically transparent major planar surface serving as the face thereof, whereby incoming broadband light is absorbed by the gas, except at its resonance wavelength L, which is specularly reflected. The optically transparent face of the container optionally has a broadband anti-reflective coating to improve its out-of-band rejection of unwanted wavelengths of the light signal. An optical system utilizing this narrow passband, reflective optical filter has at least one optical element to focus incoming broadband optical signals on the optically transparent face of the narrow passband, reflective optical filter and an optical signal detection component positioned to detect reflected narrowband light of wavelength L specularly reflected from the filter. An optical imaging system utilizing this narrow passband, reflective optical filter has at least one narrow passband, reflective optical filter, at least one optical element to focus incoming broadband optical signals on the optically transparent face of the filter, and an imaging optical signal detection component positioned to detect and view reflected narrowband light of wavelength L specularly reflected from the filter, thereby providing an image of the source of the optical signals.

10 Claims, 3 Drawing Sheets

NARROW BANDPASS REFLECTIVE OPTICAL FILTER

BACKGROUND OF THE INVENTION

This invention pertains to optical filters generally, and more specifically to a class of optical elements which can be used to build optical systems with very narrow band transmission.

Narrow band optical systems have been developed for a wide variety of applications for many years. The usual objective is to isolate an optical signal of a specific wavelength in the presence of a large flux of noise, i.e., radiation at other wavelengths. The conventional systems make use of optical filters which are based on selective reflection of metals, or on dielectric layers, or on absorption. These conventional optical filters remove radiation at the unwanted wavelengths, and allow the desired wavelengths to pass through the system.

Some prior-art optical filtering systems make use of selective atomic transitions in a gaseous environment to create photons of a different wavelength from the photons of the signal wavelength, cf. J. B. Marline, J. Nilsen, L. C. West, and L. L. Wood, *J. Applied Physics*, V50, No. 2, Feb. 1979. This transformation of wavelengths simplifies the process of filtering or isolating the signal photons from the noise photons.

The conventional approach to narrow band optical systems using prior art optical filters has several disadvantages. First, as the pass band is narrowed, the throughput at the desired wavelength is diminished also. Thus, low intensity radiation cannot be observed. Second, the transmission characteristics of selective reflectors is dependent on the angle which the optical rays make with the plane of the filter. This precludes the use of such filters in wide angle or fast optical systems. Third, the transmission band of conventional optical filters is affected by environmental factors such as temperature, so that the pass band may not match the wavelength of the signal.

The prior-art optical systems utilizing wavelength shifting techniques in a gaseous environment for filtering have several disadvantages. These optical systems do not allow imaging by the optical system. These optical systems are bulky because they require sufficient optical path length at low densities to efficiently convert the incoming signal to a new wavelength. Moreover, some gasses must be excited out of the ground state with a laser beam in order to obtain a fluorescent conversion that corresponds to the incoming light, cf. J. A. Gelbwachs, *IEEE J. Quantum Electronics*, V24, No. 7, July 1988.

SUMMARY OF THE INVENTION

A principal object of the present invention is to provide an imaging optical filtering system which can utilize fast or wide angle optics and still maintain a very narrow pass band.

It is a further object of the invention to provide an optical system having a narrow bandpass reflective optical filter.

Yet another object of the invention is to provide a narrow passband, reflective optical filter.

Still another object of the invention is to provide a Cassegrainian telescope using a two-stage narrow passband reflective optical filter.

In a first aspect of the invention, a narrow passband, reflective optical filter at a wavelength L, has a container filled with a pressurized gas, the pressurized gas having a ground state transition corresponding to the wavelength L and being transparent to all other wavelengths. The container has at least one optically transparent major planar surface serving as the face thereof, whereby incoming broadband light is absorbed by the gas, except at its resonance wavelength L, which is specularly reflected.

In a second aspect of the invention, the optically transparent face of the container has a broadband antireflective coating to improve its out-of-band rejection of unwanted wavelengths of the light signal.

In a third aspect of the invention, an optical system having a narrow passband, reflective optical filter at a wavelength L, has at least one optical element to focus incoming broadband optical signals on the optically transparent face of the narrow passband, reflective optical filter and an optical signal detection means positioned to detect reflected narrowband light of wavelength L specularly reflected from the filter.

In a fourth aspect of the invention, an optical imaging system having a narrow passband, reflective optical filter at a wavelength L, has at least one narrow passband, reflective optical filter, at least one optical element to focus incoming broadband optical signals on the optically transparent face of the filter, and an imaging optical signal detection means positioned to detect and view reflected narrowband light of wavelength L specularly reflected from the filter, thereby providing an image of the source of the optical signals.

DESCRIPTION OF THE PREFERRED EMBODIMENT

A narrow passband optical filter plays a key role in cross-link optical communication between satellites. It must have a high out-of-band rejection to exclude the solar background reflected from the earth and moon, and even direct viewing of the sun. On the other hand, for the optical receiver to have high sensitivity to weak, i.e., low intensity light, signals, the narrow passband optical filter must have high throughput, a large aperture and a narrow noise bandwidth. It is also desirable to have an optical filter that can image the light signal source so that the receiver can track on the signal. Finally, an optical filter with a wide field of view will allow the receiver to search and acquire an optical signal over a large area without having to scan the area repeatedly through a narrow field of view.

In the early part of this century various investigators studying the spectroscopy of gases had observed that, as the vapor pressure of a gas increased, an incident beam of light at one of the persistent ground-state transitions of the gas would transit from diffuse reflection, that is, absorption and reradiating, to specular reflection. It was observed that the output beam of a monochromator could scan across the ground-state transition, and a very strong specular reflection of the beam was observed at the wavelength corresponding the ground-state transition. Moreover, it was found that the addition of quenching vapors to the primary gas had no effect on the reflectivity, suggesting that the reflectivity was not due to a state transition.

We have not found a complete theoretical treatment of this phenomenon. However, the heuristic explanation is that, as the density of the gas increases, the atoms are sufficiently close as to cause the emitted spherical waves from the interaction of the incoming photons with the ground-state transitions to be in phase at the angle of specular reflection.

There is no quantitative model or theory explaining this process. It is postulated that, when the intra-atomic separation is on the order of the wavelength of the light corresponding to the ground state transition for the atom, the spherical waves of the scattered light at that wavelength are in phase at the angle of spectral reflectance, thus leading to a strongly reflected signal. Since the wavelength of light is on the order of 0.5 micron, the molar density of the gas corresponding to a separation of 0.5 micron is $\sim 10^{-7}$ mole per liter. This density is entirely consistent and practical for the embodiment of this invention disclosed herein.

The concept of this invention is based on the observed but little understood fact that a high density gas can act as a specular mirror for light whose wavelength corresponds to a transition between the ground state and an upper state of the atoms comprising the gas. Light at such wavelengths is known as resonance radiation. The gas is essentially transparent to all other wavelengths.

Figure 1:
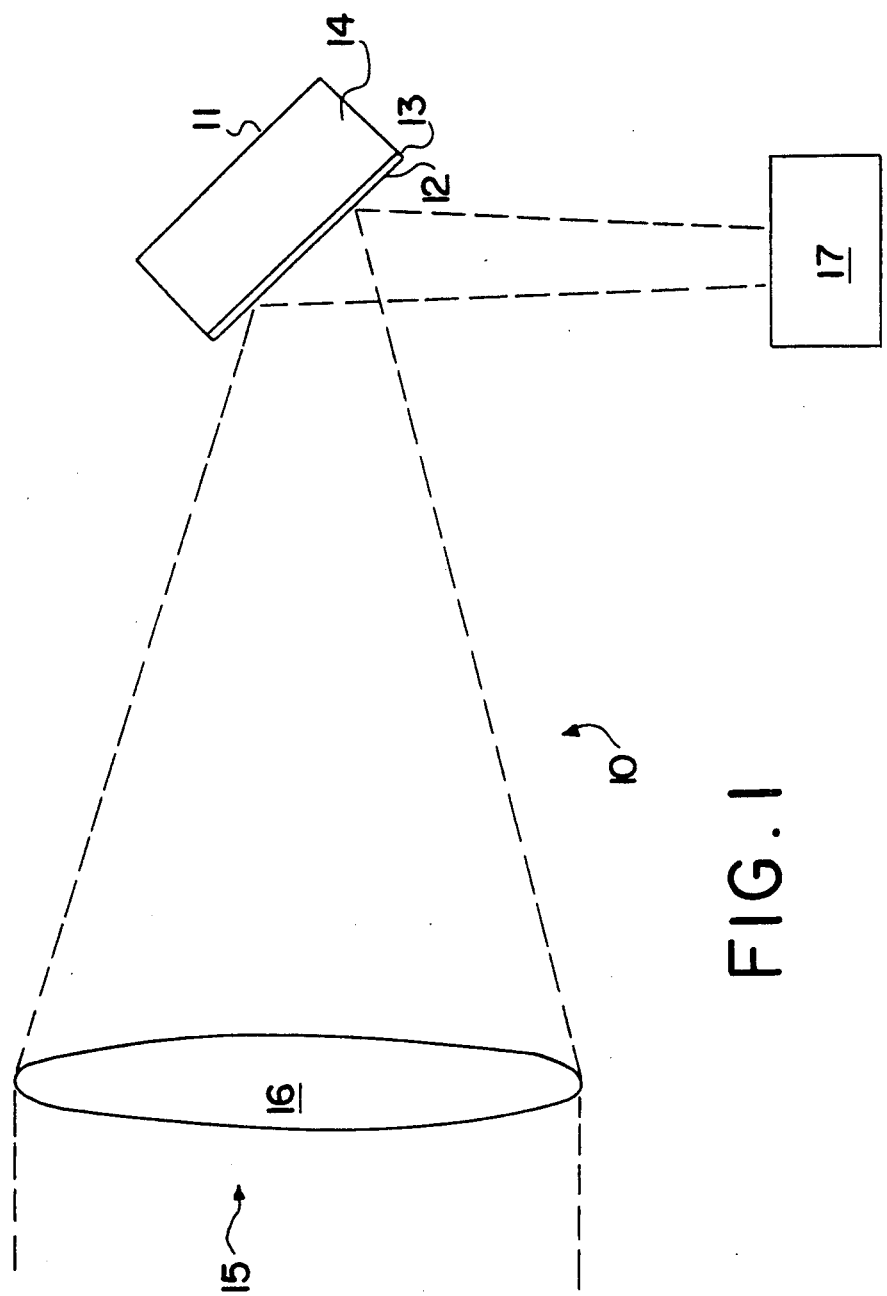
FIG. 1 is a diagrammatic illustration of an embodiment of an optical filtering system using a narrowband, reflective optical filter, according to the principles of the invention.

A generalized embodiment of an imaging optical system 10 using a narrow passband reflective optical filter according to the invention is illustrated schematically in FIG. 1. A glass cell 11, having an optically transparent face 12 with a broadband anti-reflective coating 13, is filled with a pressurized gas 14 with a resonant ground state transition. Incoming broadband light 15 from an optical signal source or light source (not shown) is focused through an optical element 16 on the face 12 of cell 11. At the resonance wavelength of the incoming light 15, cell 11 acts as a mirror and an optical signal detector 17 sees an image of the source. All other wavelengths are absorbed in the pressurized gas 14 in cell 11, and the signal detector 17 sees nothing. The optical signal detector 17 may be any imaging detection means which can detect and view an image of the source. Of course, other reflection-based optical elements could be made to operate on resonant reflection as well. As an example, a telescope based on such an element is described in this specification.

Figure 2:
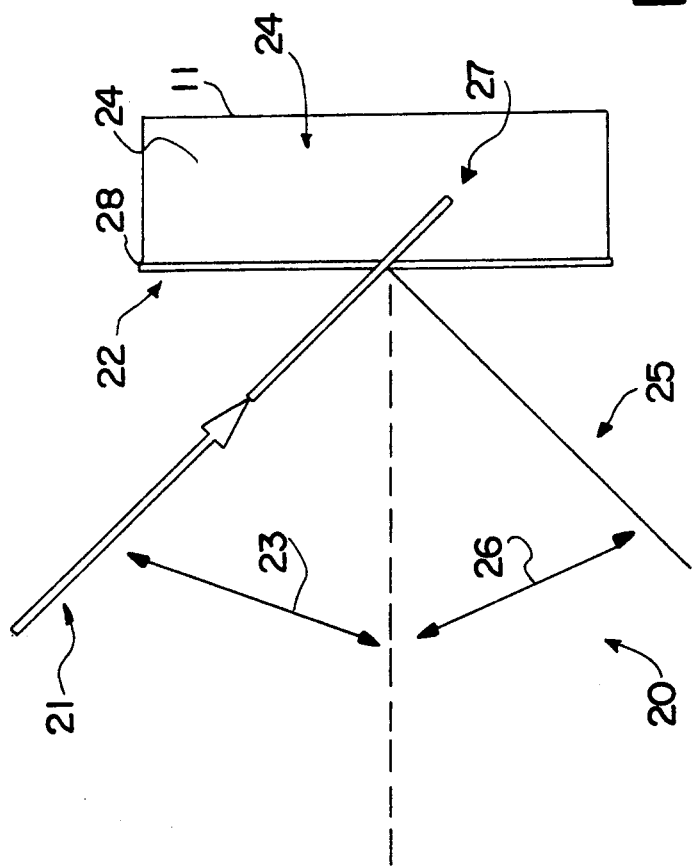
FIG. 2 is a diagrammatic illustration of the operation of an embodiment of a narrow passband, reflective optical filter, according to the principles of the invention.

FIG. 2 illustrates schematically the operation of the preferred embodiment of a narrow passband, reflective optical filter 20, utilizing the cell 11 of FIG. 1. The incoming broadband light 21 enters the optically transparent face 22 of the cell at an angle of incidence 23. The transparent face 22 has an optional broadband anti-reflective coating 28, so that all the light incident upon the face 22 passes through the face and into the pressurized gas 24. This gas 24 has a ground state transition at the wavelength L and at sufficient pressure the gas will spectrally reflect light at the wavelength L, with an angle of reflection 26 equal to the angle of incidence 23. The out-of-band light 27 is absorbed and dissipated in the cell 11.

The optional anti-reflective coating 28 serves to improve the out-of-band rejection of the optical filter 20. If the coating is omitted, a small percentage of the broadband light will also be reflected by cell face 22.

The choice of gases to use in optical filter 20 is a function of the wavelength of interest to the system user. For wavelengths in the ultraviolet range, for example, vapors of mercury or cadmium may be used. For wavelengths in the red to near infrared range, for example, potassium, rubidium or cesium may be used. In the far ultraviolet range, elements, such as the noble gasses, are candidates. Likewise, the choice of anti-reflective coating 28 to be used on a particular filter 20 is a function of the wavelength of interest to the user. A frequently used dielectric layer or coating is magnesium fluoride. The vapor pressure required for operation of the optical filter of this invention is on the order of 0.1 to 2.0 atmospheres.

Figure 3:
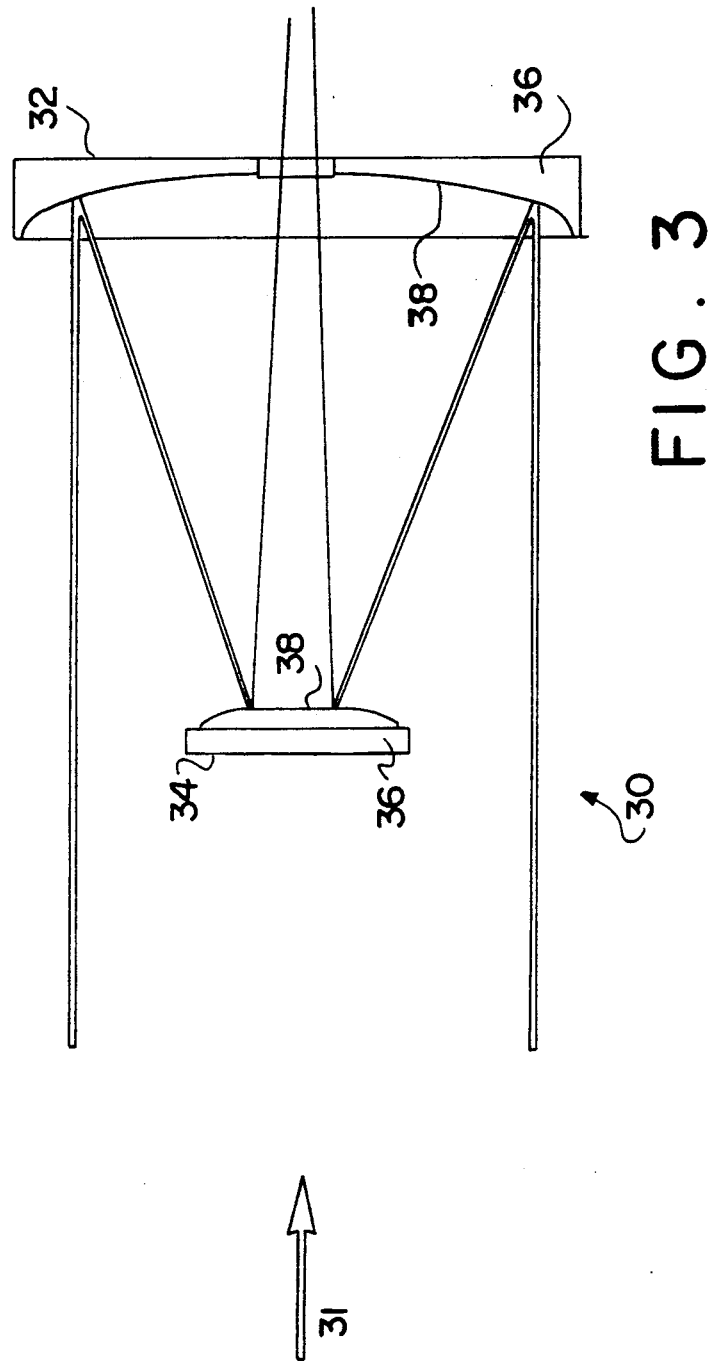
FIG. 3 is a schematic illustration of an application of the present invention in an embodiment of a Cassegrainian telescope using a two-stage narrow passband, reflective optical filter, according to the invention.

FIG. 3 illustrates an application of the preferred embodiment of the disclosed pressurized gas optical filter having all of these features, as well as one additional feature, the use of filter 20 in a multistage application. This implementation of this technology uses the filter 20 in a cassegrainian telescope 30, which is a typical and frequently used optical system. For this embodiment, either or both the primary 32 and secondary 34 mirrors of the telescope 30 are glass vessels filled with a pressurized gas 36 such that only a specified wavelength is specularly reflected. The "reflecting" surfaces 38 are coated for broadband antireflection and shaped to obtain the appropriate focal properties of the telescope 30. The incoming signal 31 specularly reflects from the gas 36 into optical signal detectors (not shown) and the out-of-band light is absorbed within the pressurized gas filter 32, 34.

The following principal features are embodied in the optical filter of the present invention. By utilizing the phenomenon of specular reflection, this filter has a wide acceptance angle, very high "throughput, and a very narrow passband. A major advantage is that this filter can image the source of the light signal. The optical filter of the present invention is totally passive, unless an elevated temperature is required to maintain vapor pressure. The vapor pressure is low enough to allow for a large aperture device.

This invention provides a compact, light-weight narrowband optical filter that is not vulnerable to optical damage from intense light or radiation, and is otherwise very reliable. This optical filter can be used in any optical system requiring a wide angle, narrow band optical filter. Moreover, as shown in the example of FIG. 3, the optical system can comprise multiple filter elements to improve the out-of-band rejection of the incoming light.

We claim:
1. A narrow passband, reflective optical filter at a wavelength L, comprising:
   a container adapted to hold a pressurized gas and having at least one optically transparent major planar surface serving as the face thereof;
   said container being filled with a pressurized gas having a ground state transition corresponding to the wavelength L, said gas being transparent to all other wavelengths;
   whereby incoming broadband light is transmitted through said gas, except at its resonance wavelength L, which is specularly reflected.

2. The filter of claim 1, further comprising:
a broadband anti-reflective coating on said optically transparent face of said container.

3. An optical system having a narrow passband, reflective optical filter at a wavelength L, comprising:
a cell adapted to hold a pressurized gas and having an optically transparent face;
said cell containing a pressurized gas having a ground state transition corresponding to the wavelength L, said gas being transparent to all other wavelengths;
at least one optical element to focus incoming broadband optical signals on said optically transparent face of said cell; and
optical signal detection means positioned to detect reflected narrowband light of wavelength L specularly reflected from said cell.

4. The optical system of claim 3, further comprising:
a broadband anti-reflective coating on said optically transparent face of said cell.

5. An optical imaging system having a narrow passband, reflective optical filter at a wavelength L, comprising:
a narrow passband, reflective optical filter comprising a cell having an optically transparent face and containing a pressurized gas having a ground state transition corresponding to said wavelength L, said gas being transparent to all other wavelengths;
at least one optical element to focus incoming broadband optical signals on said optically transparent face of said filter; and
imaging optical signal detection means positioned to detect and view reflected narrowband light of wavelength L specularly reflected from said filter, thereby providing an image of the source of said optical signals.

6. The optical imaging system of claim 5, further comprising:
a broadband anti-reflective coating on said optically transparent face of said cell.

7. A multistage optical imaging system having a plurality of narrow passband, reflective optical filters at a wavelength L, comprising:
a first narrow passband, reflective optical filter comprising a cell having an optically transparent face and containing a pressurized gas having a ground state transition corresponding to said wavelength L, said gas being transparent to all other wavelengths;
at least one optical element to focus incoming broadband optical signals on said optically transparent face of said first narrow passband, reflective optical filter;
a second narrow passband, reflective optical filter comprising a cell having an optically transparent face and containing a pressurized gas having a ground state transition corresponding to said wavelength L, said gas being transparent to all other wavelengths;
said second narrow passband, reflective optical filter positioned to receive reflected narrowband light of wavelength L specularly reflected from said first narrow passband, reflective optical filter; and
imaging optical signal detection means positioned to detect and view reflected narrowband light of wavelength L specularly reflected from said second narrow passband, reflective optical filter, thereby providing an image of the source of said optical signals.

8. The multistage optical imaging system of claim 7, further comprising:
a broadband anti-reflective coating on said optically transparent face of at least one of said narrow passband, reflective optical filters.

9. The multistage optical imaging system of claim 7, further comprising:
at least one additional narrow passband, reflective optical filter intermediate said first and second narrow passband, reflective optical filters, thereby further improving the out-of-band rejection of said system.

10. The multistage optical imaging system of claim 7, wherein said system is a Cassegrainian telescope.

* * * * *